(12) United States Patent
Fujita

(10) Patent No.: US 6,291,057 B1
(45) Date of Patent: Sep. 18, 2001

(54) COMPOSITE PRODUCT, PREFORM FOR MAKING THE COMPOSITE PRODUCT AND PROCESS OF MAKING THE PREFORM

(75) Inventor: Makoto Fujita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/239,834

(22) Filed: Jan. 29, 1999

(30) Foreign Application Priority Data

Jan. 30, 1998 (JP) .................................................. 10-034007
Jan. 13, 1999 (JP) .................................................. 11-006986

(51) Int. Cl.$^7$ ...................................................... B32B 17/12
(52) U.S. Cl. ............................................................ 428/293.4
(58) Field of Search ........................................... 428/293.4

(56) References Cited

U.S. PATENT DOCUMENTS 5,137,789   8/1992   Kaushal .

FOREIGN PATENT DOCUMENTS

| 0 388 348 | 9/1990 | (EP) . |
| 0 776 998 A1 | 6/1997 | (EP) . |
| 0 933 439 A1 | 8/1999 | (EP) . |
| 6-192765 | 7/1994 | (JP) . |
| 9-316566 | 12/1997 | (JP) . |

OTHER PUBLICATIONS

A Dictionary of Physics and Chemistry, published Dec. 5, 1983 by Iwanami Books, p. 44 with attached chart and English translation of same, 7 pgs. total.

Refining of Non–Ferrous Metals, published 1964 by the Japan Institute of Metals with attached Chart Appendant to Refining of Non–Ferrous Metals, and English translation of same, 6 pgs. Total.

*Primary Examiner*—Edward J. Cain
(74) *Attorney, Agent, or Firm*—Nixon Peabody LLP; Donald R. Studebaker

(57) ABSTRACT

A preform used as a reinforcement of a composite product is formed by heating a homogeneous slurry mixture of oxide type ceramic particles and/or oxide type ceramic whiskers which are reactive with magnesium (Mg) and a metal oxide having standard energy of formation equal to or less than a magnesium oxide (MgO) or an inorganic compound formed by decomposing the metal oxide to sinter the oxide type ceramic particles and/or oxide type ceramic whiskers.

39 Claims, 13 Drawing Sheets

EX-I

BEFORE HEAT TREATMENT

SEM IMAGE

EX-I

BEFORE HEAT TREATMENT

Ti-CHARACTERISTIC

EX-I

BEFORE HEAT TREATMENT

O-CHARACTERISTIC

EX-1

BEFORE HEAT TREATMENT

Ca-CHARACTERISTIC

10 μm

EX-1

BEFORE HEAT TREATMENT

Mg-CHARACTERISTIC

10 μm

EX-1

AFTER HEAT TREATMENT

SEM IMAGE

10 μm

EX-I

AFTER HEAT TREATMENT

Ti-CHARACTERISTIC

10 μm

EX-I

AFTER HEAT TREATMENT

O-CHARACTERISTIC

10 μm

EX-I

AFTER HEAT TREATMENT

Ca-CHARACTERISTIC

10 μm

EX - I

AFTER HEAT TREATMENT

Mg-CHARACTERISTIC

10 μm

CS - I

BEFORE HEAT TREATMENT

SEM IMAGE

CS - I

AFTER HEAT TREATMENT

Ti-CHARACTERISTIC

10 μm

CS - I

BEFORE HEAT TREATMENT

O-CHARACTERISTIC

10 μm

CS - I

BEFORE HEAT TREATMENT

Mg-CHARACTERISTIC

10 μm

CS - I

AFTER HEAT TREATMENT

SEM IMAGE

10 μm

CS - I

AFTER HEAT TREATMENT

Ti-CHARACTERISTIC

10 μm

CS - I

AFTER HEAT TREATMENT

O-CHARACTERISTIC

10 μm

CS - I

AFTER HEAT TREATMENT

Mg-CHARACTERISTIC

10 μm

EX - II

EX - II

CS - II

CS - II

EX - II

CS - II

COMPOSITE PRODUCT, PREFORM FOR MAKING THE COMPOSITE PRODUCT AND PROCESS OF MAKING THE PREFORM

BACKGROUND OF THE INVENTION

1. Field of the Invention

This invention relates to a preform for a light metal alloy composite product mixed with magnesium, a preform suitable as a reinforcement for making the light metal alloy composite product which is produced by sintering oxidized ceramic particles or whiskers and process of forming the preform.

2. Description of Related Art

In order to reinforce an aluminum alloy products mixed with magnesium such as AC4A and AC4AC aluminum alloys (which are specified in Japanese Industrial Standard H5202—Aluminum Alloy Castings 1992), it is typical to combine an aluminum alloy product with a reinforcement such as discontinuous or chopped fibers, ceramic whiskers and/or ceramic particles. In recent years, in view of partly combining an aluminum alloy product with a reinforcement and the simplicity and convenience of composite product formation, it is a tendency to make use of a continuous pore type of pre-shaped porous form (which is referred to as a preform) as a reinforcement for a composite product. This porous preform as a reinforcement is impregnated with a molten aluminum alloy to convert into a composite product. As materials used to make the porous preform, there are enumerated titanium oxide particles which are easily sintered and relatively cheep as ceramic particles, and aluminum borate ($9Al_2O_3.2B_2O_3$) whiskers and potassium titanate ($K_2O._6TiO_2$) whiskers as ceramic whiskers.

In order for a composite product produced from the preform formed by sintering ceramic particles or ceramic whiskers to produce an increase in strength and hardness, it is typical to apply hear treatment to the composite product. However, it is difficult to increase the strength and hardness of a composite product produced by impregnating a magnesium contained aluminum alloy as a base metal with a sintered ceramic preform even by the aid of heat treatment. Table I shows by way of example tensile strength and hardness for products of F- and T6-aluminum alloy castings (AC8A), one of which is mixed with potassium titanate ($K_2O.6TiO_2$) whiskers as a reinforcement and the other of which is not mixed with any reinforcement. The symbols "AC8A" and "AC4A" as used in the specification are designations for types of aluminum alloy castings defined in JIS H5202 (Japanese Industrial Standard, 1992) and the symbols "F" and "TX" as used herein are temper designation for aluminum and aluminum alloys defined in JIS H0001 (Japanese Industrial Standard, 1988). The temper designation "F" designates aluminum and aluminum alloys as they are produced with neither work hardening nor heat treatment, and the temper designation "T6" designates aluminum and aluminum alloys which have been provided with heat-treatment and subsequent precipitation hardening treatment for stable mechanical properties.

TABLE I

| Molten Metal Casting | | Tensile Strength (MPa) | | Hardness (Hv) | |
|---|---|---|---|---|---|
| Base Metal | Reinforcement | F-Product | T6-Product | F-Product | T6-Product |
| AC8A | Potassium Titanate | 200–230 | 200–230 | 110–120 | 11–120 |
| AC8A | None | 180 | 340 | 85 | 150 |

As summarized in Table I, it is apparent on comparison between an F-aluminum alloy (AC8A) product and T6-aluminum alloy (AC8A) product that heat-treatment is effective in increasing tensile strength and hardness of the AC8A aluminum alloy product not mixed with any reinforcement and is however of no effect on the AC8A aluminum alloy product mixed with potassium titanate ($K_2O.6TiO_2$) whiskers as a reinforcement. On account of this, there are even cases where aluminum alloy products mixed with no reinforcement outperform reinforcement mixed aluminum alloy products in strength and hardness when they have been heat-treated.

This is thought to arise from the following case. During heat treating a magnesium (Mg) contained aluminum alloy to provide a solution of the aluminum alloy, the magnesium (Mg) chemically combines with silicon (Si) to precipitate magnesium silicate ($Mg_2Si$) in the structure with an effect of increasing hardness of the aluminum alloy. However, when an oxide type ceramic used to form a preform contains a compound capable of easily chemically combining with magnesium (Mg), while the preform is transformed into a solution under a high temperature during producing a composite product or during heat treatment of a composite product produced from the preform, the oxide type ceramic chemically combines with magnesium (Mg) with an effect of reducing precipitation of magnesium silicate ($Mg_2Si$) which brings about precipitation hardening.

Specifically, in the case where the utilization is made of a titanium oxide or a potassium titanate ($K_2O.6TiO_2$) as an oxide type ceramic to form a preform, magnesium has been considered to be is consumed with progress of the reaction expressed by the following chemical formula (I). In this instance, titanium (Ti) precipitated as a result of the chemical reaction expressed by the formula (I) further reacts with aluminum (Al) as expressed by the following chemical formula (II) when an aluminum alloy is used as a base metal.

$3TiO_2 + 2Mg \rightarrow 2MgTiO_3 + Ti$ (I)

$Ti + 3Al \rightarrow Al_3Ti$ (II)

The consumption of the magnesium (Mg) deprives the preform of precipitation of magnesium silicate ($Mg_2Si$) and, in consequence, there is no increase in hardness of a composite product by means of heat treatment.

When the utilization is made of aluminum borate ($9Al_2O_3.2B_2O_3$) as an oxide type ceramic, the aluminum borate ($9Al_2O_3.2B_2O_3$) and decomposed aluminum oxide ($Al_2O_3$) react with magnesium (Mg) to prevent precipitation of magnesium silicate ($Mg_2Si$), and hence precipitation hardening.

Further, when the utilization is made of a preform formed by sintering ceramic whiskers, it is hard to provide an increase in hardness by means of heat treatment, and moreover there occurs aggravation of physical properties of a composite product produced from the preform due to disappearance of whiskers resulting from a reaction of the oxide type ceramic with magnesium and/or formation of porosity or cavities due to the disappearance of whiskers.

As described in Japanese Unexamined Patent Publication No. 6-192765, it has been known to add a powdered inorganic binder in ceramic whiskers and/or chopped fibers which is press formed as a preform. The inorganic binder is prepared by cooling a molten mixture of silicon oxide ($SiO_2$), an aluminum oxide ($Al_2O_3$), a magnesium oxide (MgO) and calcium oxide (CaO) and breaking the mixture into powders. During producing the inorganic binder powders, the silicon oxide ($SiO_2$) possibly reacts with the aluminum oxide ($Al_2O_3$), magnesium oxide (MgO) and/or calcium oxide (CaO) to produce chemical compounds and, in consequence, will be unable to afford its own reaction with ceramic whiskers and/or chopped fibers during heat-treating a mixture of the ceramic whiskers and/or chopped fibers and inorganic binder.

SUMMARY OF THE INVENTION

It is therefore an object of the invention to provide a preform for making the composite product which is prevented from a chemical reaction between a component which is one of source materials for a reduction in heat treatment effect to the preform and magnesium, a process of forming the preform, and a composite product produced in which the preform is used as a reinforcement.

The present invention has been made based on the knowledge attained by the inventor that a specific metal oxide prevents an oxide type ceramic from reacting with magnesium. Specifically, the preform for producing a composite product according to the invention is of the type formed by sintering oxide type ceramic particles and/or whiskers reactive with magnesium and contains a metal oxide which has standard energy of formation equal to or less than a magnesium oxide.

There are enumerated as the oxide type ceramic a titanium oxide ($TiO_2$) particles and a silicon oxide ($SiO_2$) in the form of particles and a potassium titanate ($K_2O.6TiO_2$) and an aluminum borate ($9Al_2O_3.2B_2O_3$) in the form of whiskers. As the metal oxide that has standard energy of formation equal to or less than a magnesium oxide, it is preferred to select at least one from a group of a calcium oxide (CaO), a magnesium oxide (MgO) and an aluminum oxide ($Al_2O_3$). The preform may contain discontinuous or chopped fibers.

The process of forming the preform for a composite product comprises steps including preparing a homogeneous mixture of oxide type ceramic particles and/or whiskers that are chemically reactive with magnesium (Mg) and a metal oxide having standard energy of formation equal to or less than a magnesium oxide (MgO) or inorganic chemical compound produced resulting from decomposition of the metal oxide, heating the homogeneous mixture to sinter the oxide type ceramic particles and/or whiskers. The inorganic chemical compound is preferred to be a calcium carbonate ($CaCO_3$). The amount of a metal oxide added to the mixture is between 0.1 and 80% in volume content with respect to the amount of reinforcement. The homogeneous mixture may be mixed with flammable vanishing particles, an inorganic binder and/or chopped fibers.

The composite product is produced by filling up pores of the preform with an aluminum alloy containing magnesium (Mg) and preferably has a structure of magnesium silicate ($Mg_2Si$).

The term "standard energy of oxide formation" refers to standard free energy generally expressed by the formula (III) necessary for formation of an oxide expressed by the following formula (IV):

where $\Delta G^0$ is the change in Gibbs' free energy in a chemical reaction for formation of one mole of substance in the standard condition from an element in the normal standard condition;

R is the gas constant (1.987 cal/mole.K);

T is the absolute temperature (K);

$P_{O2}$ is the partial pressure of oxygen which is specifically shown in, for example, "Nonferrous Metal Making" by The Metal Society of Japan.

The metal oxide that has the standard energy of formation equal to or less than magnesium (Mg) reacts with an oxide type ceramic to form a stable chemical compound, so as thereby to prevent the oxide type ceramic from reacting with magnesium (Mg). In other words, the metal oxide prevents consumption of magnesium (Mg) in the aluminum alloy from being consumed and causes the oxide type ceramic to precipitate magnesium silicate ($Mg_2Si$) in its structure and exhibit the intended effect of heat treatment in consequence.

According to the invention, since the preform contains a metal oxide having the standard energy of formation equal to or less than magnesium (Mg), even when it has a skeletal structure comprised of an oxide type ceramic reactive with magnesium (Mg) and is utilized to make a composite product of light metal alloy containing magnesium (Mg), the oxide type ceramic of the preform is prevented from chemically reacting with magnesium (Mg) in the base metal for the composite product. Accordingly, when applying heat treatment such as T6-heat treatment to the composite product, the composite product precipitates magnesium silicate ($Mg_2Si$) with an effect of age hardening, so as thereby to provide an increase in strength and hardness. When utilizing oxide type ceramic whiskers for the preform, a chemical reaction of the whiskers with magnesium (Mg) is prevented, as a result of which there occurs no change due to aging such as disappearance of the whiskers. Further, by virtue of a chemical reaction of the oxide type ceramic forming a skeletal structure of the preform with a metal oxide having the standard energy of formation equal to or less than magnesium (Mg), the preform provides an increase in its own strength.

According to the process of forming the preform of the invention, sintering of the preform is improved by the aid of coexistence of a specific metal oxide in the oxide type ceramic. The preform containing a reinforcement is sintered at a temperature lower than a preform containing the same reinforcement formed by the conventional process. Furthermore, the preform is provided with an improved porosity, resulting in a lower pressure for producing a composite product from the preform.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
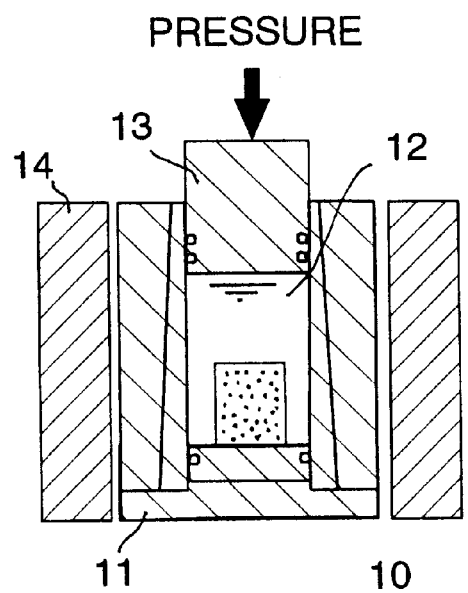
FIG. 1 is a schematic cross-sectional view showing a squeeze casting apparatus for producing a composite product.

The term "volume fraction" as used herein shall mean and refer to a ratio of a volume of a component material of a mixture for a porous preform, such as ceramic particles and ceramic whiskers, before sintering which is calculated based on the proportion and specific gravity of the component material relative to the volume of a composite product provided by impregnating the porous preform with a molten base metal.

The following description is directed to a preform which is used to produce a composite product and a process of forming the preform.

A homogeneous mixture is provided by blending oxide type ceramic particles capable of reacting with magnesium and metal oxide particles having standard energy of formation equal to or less than a magnesium oxide (MgO). The oxide type ceramic capable of reacting with magnesium refers to oxide type ceramics which form a skeletal structure of a preform and permit its ceramic component to entirely or partly combine with magnesium. There are enumerated as the oxide type ceramic a titanium oxide ($TiO_2$) and a silicon oxide ($SiO_2$) in the form of particles and a potassium titanate ($K_2O.6TiO_2$) and an aluminum borate ($9Al_2O_3.2B_2O_3$) in the form of whiskers. One or more than one of these oxide type ceramics may be used to provide desired properties of the preform. For example, because of the prominent ability to be sintered, titanium oxide particles alone are used to form a skeletal structure of the preform, or titanium oxide particles and other ceramics together are used to increase the ability to be sintered of the ceramic particles. Furthermore, because of prominent abrasion resistance, the preform may contain a titanium oxide to increase its abrasion resistance. A mixture composed mainly of ceramic particles may contain ceramic whiskers to provide an increase in strength. Not only ceramic whiskers alone but a mixture composed mainly of ceramic whiskers containing titanium oxide particles may be used to form the preform with an effect of increasing the ability to be sintered of the ceramic whiskers.

While the particle size of the ceramic particles depends upon kinds of ceramics, it is preferred to be greater than 0.1 $\mu$m and more particularly than 0.3 $\mu$m but less than 10.0 m $\mu$ and more particularly than 1.0 $\mu$m in terms of the ability to be sintered. If the lowest limit of 0.1 $\mu$m is exceeded, it is difficult to make a ceramic mixture. On the other hand, if the highest limit of 10.0 $\mu$m is exceeded, it is difficult to sinter the ceramic particles due to a drop in surface energy of the particle. As to ceramic whiskers, the whisker is preferred to have a diameter between 0.5 and 1.0 μm and a length between 10.0 and 30 μm. Whiskers having a diameter and a length exceeding the lowest limits, respectively, are too thine and short to provide the preform with a desired size of pores, so as to make it difficult to impregnate the preform with a molten base metal for producing a composite product. On the other hand, whiskers having a diameter and a length exceeding the highest limits, respectively, are too thick and long to be filled in a mixture for the preform. The filling proportion of an oxide type ceramic of a mixture for a preform is from a limit of the utmost dense filling for the oxide type ceramic to a minimum volume fraction (Vf) of 40% relative to the entire mixture when the oxide type ceramic is in the form of particles alone or to a minimum volume fraction (Vf) of 25% relative to the entire mixture when the oxide type ceramic is in the form of whiskers alone. In this instance, as the minimum volume fraction (Vf) representing the filling proportion increases, while the strength of a preform becomes higher, the oxide type ceramic density is too high to provide a desired size of pores, which is always undesirable for impregnation of the preform with a molten base metal. In the term of easy impregnation with a molten base metal, the filling proportion of an oxide type ceramic is desirable to be less than 25% in volume content in the case of particles alone or less than 15% in volume content in the case of whiskers alone. When the utilization is made of an oxide type ceramic mixture of particles and whiskers, the filling proportions of these oxide type ceramic particles and whiskers are less than 40 and 25% in volume content, respectively and, more particularly, less than 25 and 15% in volume content, respectively. These proportions may be appropriately determined according to a preform demand for strength and easiness of the impregnation with a molten base metal.

In the case where an oxide type ceramic and magnesium coexist, a metal oxide having standard energy of oxide formation equal to or less than a magnesium oxide (MgO) is used to react with an oxide type ceramic in preference to magnesium. This reaction of the metal oxide in preference to the magnesium leads to arresting development of a reaction of the oxide type ceramic with the magnesium with an effect of preventing consumption of magnesium in a base metal. A calcium oxide (CaO), a magnesium oxide (MgO) and an aluminum oxide ($Al_2O_3$) are available as the metal oxide having standard energy of oxide formation equal to or less than a magnesium oxide (MgO). These metal oxides may be combined into a mixture as they are, or otherwise compounds which are decomposed to produce the respective metal oxides during sintering a mixture may be used. For example, when preparing a mixture from a slurry by means of vacuum forming, it is preferred to use a carbonate, such as a calcium carbonate ($CaCO_3$) which is stable in water, in place of a calcium oxide (CaO) so as to prevent a metal oxide from reacting with water. Metal oxide particles or metal compound particles from which the metal oxide is formed by way of decomposition is preferred to have a mean particle size of approximately 0.1 to 10 μm. This is because the metal oxide particles encounter aggravation of reactivity with oxide type ceramics due to a drop in surface area and difficulty of uniform dispersion in a mixture when the upper limit is exceeded or are difficult to be formed when the lower limit is exceeded. While the metal oxide content of the mixture is different according to kinds of oxide type ceramic coexisting in the mixture and/or kinds of oxide type ceramic, i.e. particles and whiskers, it is preferred to be between 0.1 and 80% in total volume of the reinforcement material for a preform. When the lower limit is exceeded, the effect of the metal oxide does not manifest itself in any way and sintering the mixture is accelerated too fast, which leads to making a preform easily shrink. On the other hand, when the upper limit is exceeded, the oxide type ceramic causes aggravation of the ability to be sintered, which leads to a drop in strength of a preform. In view of the reaction of a titanium oxide with an oxide type ceramic, the titanium oxide content of a mixture is preferred to be greater than 1%, more particularly greater than 5%, in total volume of the reinforcement material for a preform when an oxide type ceramic is in the form of particles or to be between 0.6 and 25%, more particularly between 2 and 25%, when an oxide type ceramic is in the form of whiskers.

If necessary, the mixture may contain flammable particles, other ceramic particles and whiskers, discontinuous or chopped fibers, inorganic binders, flocculants, and other additives. The flammable particles refer to particles which are burnt out at a sintering temperature to form pores in the preform. When oxide type ceramic particles alone are filled with the utmost density with the result of the reinforcement volume fraction (Vf) of a composite product is too great, in order for the preform to improve its permeability, i.e. to control its void content or porosity, it is preferred to mix the flammable particles. There are enumerated as the flammable particles powdered resin such as polypropylen particles, polyethylene particles and polyacrylic amide particles and powdered graphite. In the light of flammability, the powdered graphite is preferred. The flammable particles are preferred to be greater than 1 μm, and in particular greater than 30 μm but smaller than 250 μm, and in particular smaller than 100 μm, in mean particle size. When the flammable particle size is too great, it takes a long time to burn out and forms large voids in the preform which affects the homogeneity of a composite product produced from the preform. On the other hand, when the flammable particle size is smaller than 1 μm, voids formed resulting from burning out of the flammable particles come to cause volume shrinkage of the ceramic particles sticking to the flammable particles during sintering, so that the preform is unsuccessful in having desired porosity. The flammable proportion of the mixture is determined according to a volume ratio of the reinforcement material, i.e. the ceramic volume fraction (Vf), of the entire composite product. As the flammable particle content increases, the ceramic volume content of a preform, i.e. the reinforcement volume fraction (Vf) of a composite product lowers with the result of causing a decrease in strength and possibly making a composite product unequal to squeeze casting. Accordingly, it is necessary to determined a proportion of the flammable particles so that at least the reinforcement material surely has a volume fraction (Vf) of approximately 10%. While the particle volume fraction of a mixture is different according to particle sizes, it generally the limit is approximately 40% even when the flammable particles are filled with the utmost density. In the light of the above, a volume ratio of flammable particles to ceramic particles is preferred to be between 10:30 and 25:15. The reinforcement volume fraction (Vf) of a composite product is adjusted between approximately 10 and 25% by providing a mixture containing these particles with the volume ratios between 10:30 and 25:15.

There are enumerated as the other ceramic silicone carbide (SiC) and boron nitride (NB) which are non-oxide type ceramics. If necessary, these non-oxide type ceramics may be mixed with an effect of increasing the hardness of a composite product.

Chopped fibers such as aluminum fibers and mullite fibers may be preferably mixed for providing a decrease in volume shrinkage rate during sintering. Specifically, it is preferred to mix chopped fibers in a mixture composed mainly of ceramic whiskers for forming a preform which is apt to cause much volume shrinkage during sintering. The chopped fiber is preferably longer in fiber length than a whisker and larger in fiber diameter than a whisker. Specifically, the chopped fiber has a fiber length between 200 and 300 μm and a fiber diameter between 2 and 10 μm. When either one or both of the upper limits are exceeded, it is difficult to uniformly disperse chopped fibers in a mixture and to provide an increase in strength of a preform due to bulky fibers. On the other hand, when either one or both of the lower limits are exceeded, the chipped fibers are substantially the same as whiskers and unable to contribute to an increase in strength of a preform. In order to provide a significant increase in strength of a preform, it is necessary to produce a skeletal structure with chopped fibers thick and long to a certain extent and make the skeletal structure hold particles or whiskers.

Because these other ceramics and chopped fibers are reinforcements for a composite product, the ceramic or fiber volume fraction of the mixture is preferable to be less than 15% even for the maximum reinforcement volume fraction. This is because, these chopped fibers and non-oxide type ceramics are generally featured by high sintering temperatures and, in consequence, the ability to be sintered of the mixture is lowered when the ceramic or fiber volume fraction of the mixture exceeds 15%.

Inorganic binders, which include colloidal materials such as silica gel and an alumina sol, are preferably mixed as a sintering aid in a mixture composed mainly of ceramic whiskers for forming a preform. Further, there are enumerated as a flocculant polyacrylic amide gel and as an additive an ammonium sulfate.

Processes which are able to uniformly mix particles, whiskers and/or chopped fibers in a reinforcement material with the utmost density are unconditionally usable as a process of preparing a homogeneous mixture containing the compounds for a preform. One of the processes which is an easy way to prepare the mixture is known from, for example, Japanese Patent Application No. 8 (1996)—331578 assigned to the applicant of this application. The process includes preparing a slurry by mixing ceramic particles and/or ceramic whiskers and metal oxides and, if necessary, flammable particles, chopped fibers and inorganic binders as additives in a dispersion fluid such as water, dewatering the slurry filled in a prescribed shape of container by means of filtration under reduced pressure and compressing the dewatered product by the use of punch to provide a homogeneous mixture body with the utmost density. Finally, the homogeneous mixture body is heated to sinter the oxide type ceramic particles and/or whiskers to provide a preform. The sintering temperature may be a temperature at which ceramics are sintered. At the sintering temperature, the oxide type ceramic forming the preform reacts with a metal oxide. For example, a calcium oxide (CaO) reacts with a titanium oxide ($TiO_2$) to produce a perovskite ($CaTiO_3$) or with an aluminum borate ($9Al_2O_3 \cdot 2B_2O_3$) to produce a compound such as ($CaAl_2B_2O_7$), ($CaAl_{12}O_{19}$) and ($CaB_2O_5$). In consequence, an oxide type ceramic such as a titanium oxide ($TiO_2$) and a boron trioxide ($B_2O_3$) is prevented from reacting with magnesium (Mg), so as to prevent or significantly reduce consumption of magnesium (Mg) in an aluminum alloy with the result of producing the expected effect of heat treatment due to precipitation hardening of magnesium silicate ($Mg_2Si$). Furthermore, there is produced an effect of lowering a sintering temperature for the oxide type ceramic as a result of formation of such a compound through the reaction of the metal oxide with the oxide type ceramic during sintering.

The preform thus formed has a skeletal structure in the state that ceramic particles, ceramic whiskers, or ceramic particles and whiskers are mutually fused and integrated together with one another through sintering. The metal oxide in the mixture for a preform exists as a compound formed through a reaction with an oxide type ceramic in a resultant preform. On the other hand, in the case where flammable particles are contained in the mixture, the particles burn out and are released from the mixture as carbon monoxide (CO) and carbon dioxide ($C_2$), forming a number of voids in the mixture, as a result of which a preform with improved permeability is provided.

The preform thus formed is used to produce a composite product by, for example, squeeze casting or gas pressure casting. The squeeze casting is one of casting techniques. As shown by way of example in FIG. 1, a molten base light metal 12 is poured into a cavity formed in a die 11 in which a preform 10 is set and pressed by means of a punch 12, so as to impregnate the preform 10 with the molten base light metal 12. A heater 14 is installed to the outside of the die 11 to heat the die 11. The gas pressure casting is another casting technique. As shown by way of example in FIG. 2, a base die 21a in which a preform 20 is set is closed with a die top cover 21b. A molten base metal 22 is introduced into a cavity formed by the base die 21a and the die top cover 21b through a supply pipe 23. Subsequently, a gas is injected into the cavity through the supply pipe 23 to press the molten base metal 22, so as thereby to impregnate the preform 20 with the molten base metal 22. A heater 24 is installed to the outside of the base die 21a and the die top cover 21b to heat them.

The base metal for a composite product is not limited to light metals and may be aluminum alloys or magnesium alloys. As was previously described, since a reaction between an oxide type ceramic and magnesium is prevented with an effect of producing the expected effect of heat treatment during forming the preform, when light metal alloys containing magnesium are used as the base metal for the composite product, the preform of the invention brings its effect into full play. There are enumerated as aluminum alloys containing magnesium AC8A and AC4A (Japanese Industrial Standard—H5202). The gas pressure applied to the molten base metal is different according to the reinforcement volume fraction of a preform which corresponds to the reinforcement volume fraction (Vf) of a composite product when the preform has almost no volume shrinkage, kinds of ceramics of which the preform is formed, the proportions of reinforcement whiskers and particles and kinds of molten base metals. Generally, since as the proportion of whiskers in a reinforcement becomes higher, the strength of a preform becomes lower, it is impossible to apply an increased pressure to the preform. However, since the preform according to the invention has increased strength, it is permitted to apply a higher pressure to the preform than that applied to the conventional preform.

Since, in the composite product thus provided, magnesium contained in the base metal does not react with the ceramics forming the preform and remains surviving, magnesium silicate ($Mg_2Si$) precipitates in the structure and is hardened by means of a heat treatment, for example the T6 heat treatment, which is practiced with an attempt at aging effects, providing an increase in strength and hardness of the composite product. Even in the case where a preform is composed mainly of ceramic whiskers, the whiskers do not disappear due to aged changes, keeping the composite product from loosing a reinforced effect by the whiskers.

The following description will be directed to examples of the preforms according to the invention.

EXAMPLE I

Figure 2:
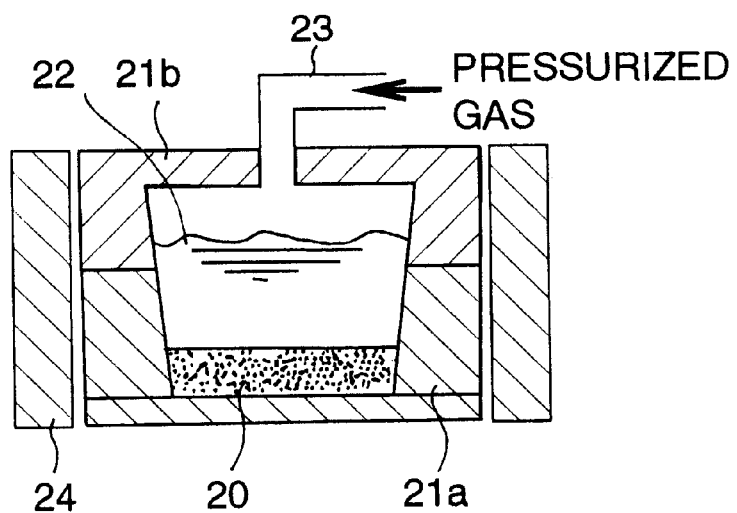
FIG. 2 is a schematic cross-sectional view showing a gas pressure casting apparatus for producing a composite product.
Figure 3:
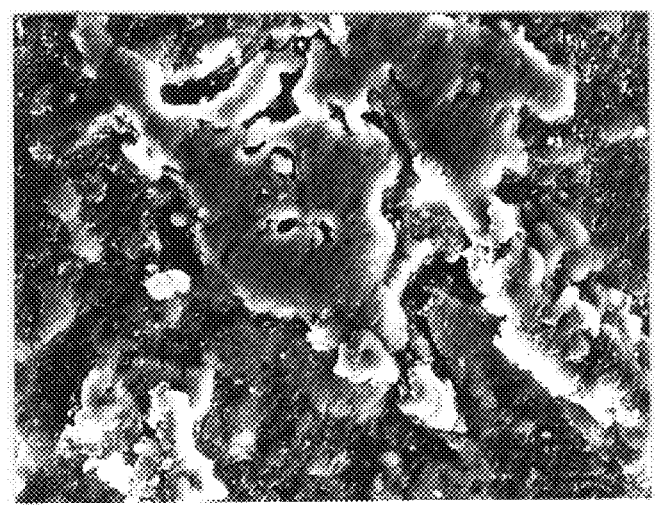
FIG. 3 is an electronic photomicrograph showing a microstructure of a composite product produced from a preform EX-I before heat treatment.

A homogeneous slurry was prepared by uniformly dispersing the rutile type of titanium oxide ($TiO_2$) particles having a mean particle size of 0.3 µm on the market as ceramic particles, aluminum borate ($9Al_2O_3.2B_2O_3$) whiskers having a mean length of 3 µm and a mean diameter of 1 µm, aluminum oxide ($Al_2O_3$) chopped fibers having a mean length of 300 µm and a mean diameter of 3 µm, calcium carbonate ($CaCO_3$) particles having a mean particle size of 5 µm, graphite particles having a mean particle size of 75 µm as flammable particles, and an alumina sol as an inorganic binder into water. The homogeneous slurry was poured in a specific shape of container and dewatered as a dewatered slurry product by a vacuum extractor. The reinforcement materials (titanium oxide particles, aluminum borate whiskers, chopped aluminum oxide fibers, calcium carbonate particles and graphite) volume fraction (Vf) of a composite product was adjusted as summarized in Table II. The graphite volume fraction (Vf) was adjusted to be 25%. The dewatered slurry product was heated at 1140° C. for three hours to form a disk-shaped preform EX-I having a diameter of 95 mm and a thickness of 15 mm. After placing the disk-shaped preform in the die 21a closed by the die top cover 21b as shown in FIG. 2, a molten aluminum alloy AC8A was poured into the cavity in the die 21a closed by the die top cover 21b through the supply pipe 23 and treated under the condition summarized in Table II to produce a composite product. The composite product was treated by the T6 heat treatment (solution treatment at 505° C. for 4.5 hours) and water quenching. Further the composite product was treated by a cooled air precipitation hardening treatment after it was left in an atmosphere at 180° C. for 6 hours.

FIGS. 3 through 7 are photographs of the composite product before heat treatment and specifically an electronic photomicrograph showing a microstructure, an X-ray photograph showing Ti-characteristic, an X-ray photograph showing O-characteristic, an X-ray photograph showing Ca-characteristic and an X-ray photograph showing Mg-characteristic, respectively. In each X-ray photograph, highlight portions indicate corresponding elements. FIGS. 8 through 12 are photographs of the composite product after hardening treatment and specifically an electronic photomicrograph showing a microstructure, an X-ray photograph showing Ti-characteristic, an X-ray photograph showing O-characteristic, an X-ray photograph showing Ca-characteristic and an X-ray photograph showing Mg-characteristic, respectively.

In order to evaluate the preform, a comparative sample preform (CS-I) was prepared. A dewatered slurry product was produced from a homogeneous slurry which was the same as that for the preform of Example I, excepting that it was not mixed with calcium carbonate ($CaCO_3$) particles. The dewatered slurry product was heated at 1250° C. for 3 hours to provide a comparative sample preform CS-I having the same dimensions as the example preform EX-I and treated under the condition as summarized in Table II to produce a composite product. The condition was the same as for the example preform EX-I, excepting that the pressure was increased to 10 atms. When the dewatered slurry product not mixed with calcium carbonate ($CaCO_3$) particles increased its sintering temperature and needed an increased pressure for impregnation with a molten metal. The comparative composite product produced from the comparative sample preform CS-I was treated by the T6 heat treatment under the same condition as the composite product produced from the example preform EX-I.

FIGS. 13 through 16 are photographs of the comparative composite product before heat treatment, and specifically an electronic photomicrograph showing a microstructure, an X-ray photograph showing Ti-characteristic, an X-ray photograph showing O-characteristic, and an X-ray photograph showing Mg-characteristic, respectively. FIGS. 8 through 12 are photographs of the comparative composite product after hardening treatment, and specifically an electronic photomicrograph showing a microstructure, an X-ray photograph showing Ti-characteristic, an X-ray photograph showing O-characteristic and an X-ray photograph showing Mg-characteristic, respectively.

TABLE II

|  | EX-I | CS-I |
|---|---|---|
| PREFORM COMPOSITION (Vf) % | | |
| Titanium Oxide | 8 | 8 |
| Aluminum Borate Whiskers | 3 | 3 |
| Alumina Fibers | 3 | 3 |
| Calcium Carbonate | 0.4 | — |
| Sintering Temperature (° C.) | 1140 | 1250 |
| COMPOSING CONDITION | | |
| Base Metal | AC8A | AC8A |
| Molten Metal Temperature (K.) | 1043 | 1043 |
| Die Temperature (K.) | 388 | 388 |
| Pressure (atm) | 4.5 | 10 |
| Preheating Temperature Of Preform (K.) | 973 | 973 |

Figure 4:
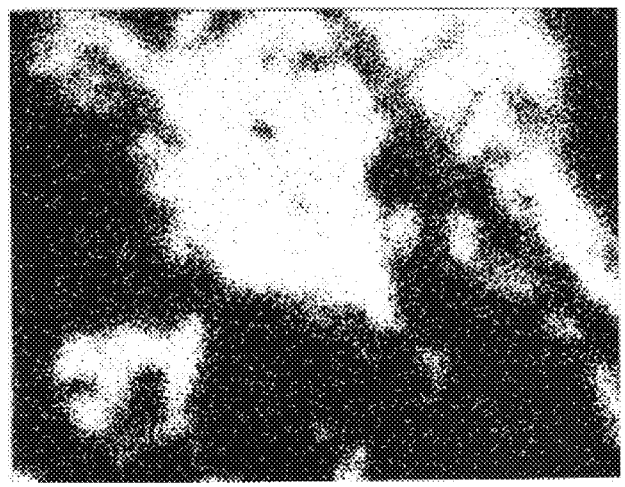
FIG. 4 is an X-ray photograph showing Ti-characteristic of the composite product produced from the preform EX-I before heat treatment.
Figure 5:
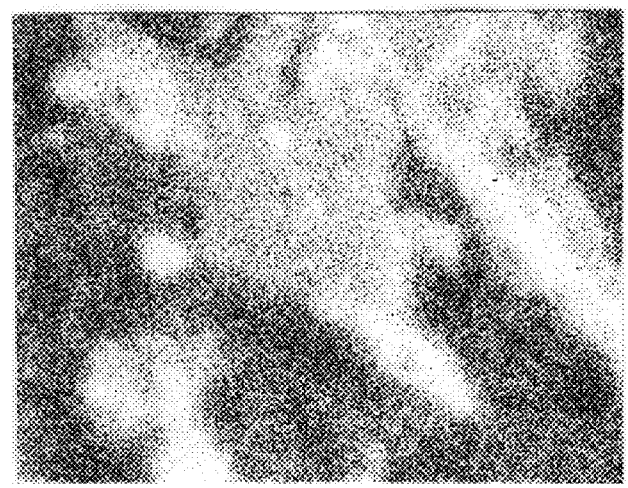
FIG. 5 is an X-ray photograph showing O-characteristic of the composite product produced from the preform EX-I before heat treatment.
Figure 6:
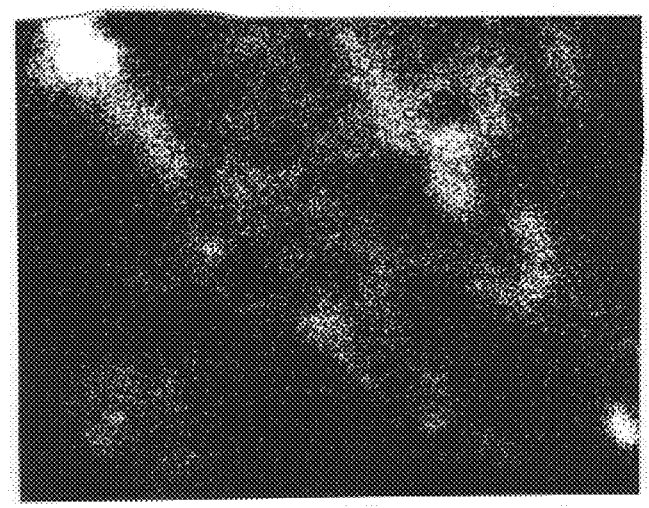
FIG. 6 is an X-ray photograph showing Ca-characteristic of the composite product produced from the preform EX-I before heat treatment.
Figure 7:
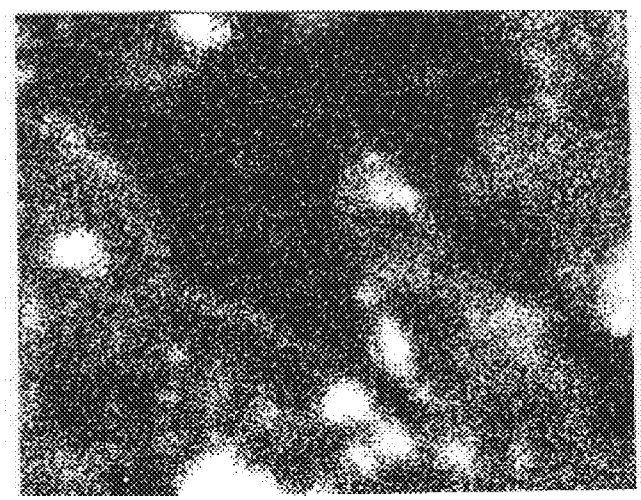
FIG. 7 is an X-ray photograph showing Mg-characteristic of the composite product produced from the preform EX-I before heat treatment.
Figure 8:
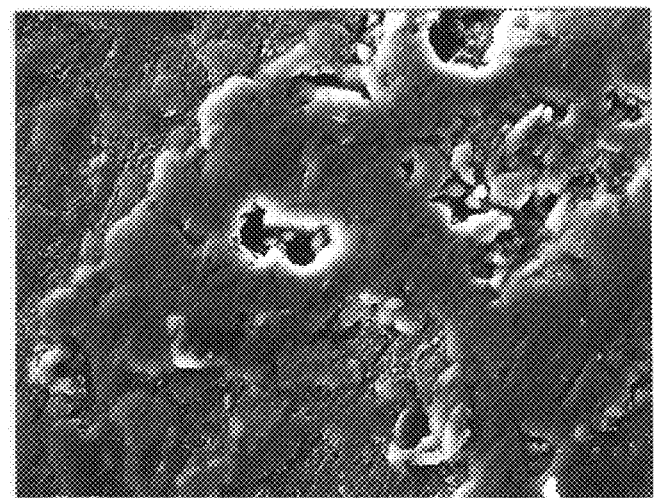
FIG. 8 is an electronic photomicrograph showing a microstructure of the composite product produced from the preform EX-I after T6-heat treatment.
Figure 9:
FIG. 9 is an X-ray photograph showing Ti-characteristic of the composite product produced from the preform EX-I after T6-heat treatment.
Figure 10:
FIG. 10 is an X-ray photograph showing O-characteristic of the composite product produced from the preform EX-I after T6-heat treatment.
Figure 11:
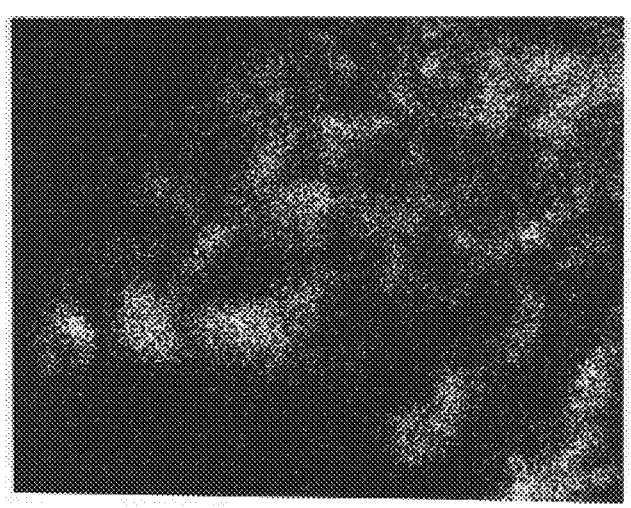
FIG. 11 is an X-ray photograph showing Ca-characteristic of the composite product produced from a preform EX-I after T6-heat treatment.
Figure 12:
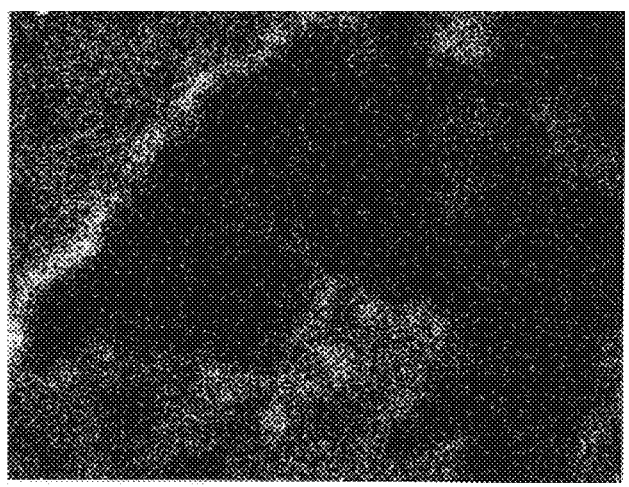
FIG. 12 is an X-ray photograph showing Mg-characteristic of the composite product produced from a preform EX-I after T6-heat treatment.
Figure 13:
FIG. 13 is an electronic photomicrograph showing a microstructure of the composite product produced from a preform CS-I before heat treatment.
Figure 14:
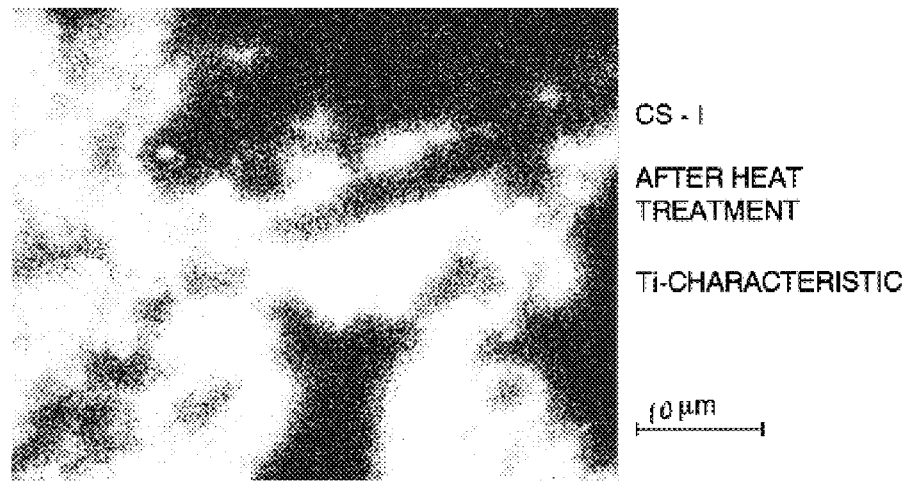
FIG. 14 is an X-ray photograph showing Ti-characteristic of the composite product produced from the preform CS-I before heat treatment.
Figure 15:
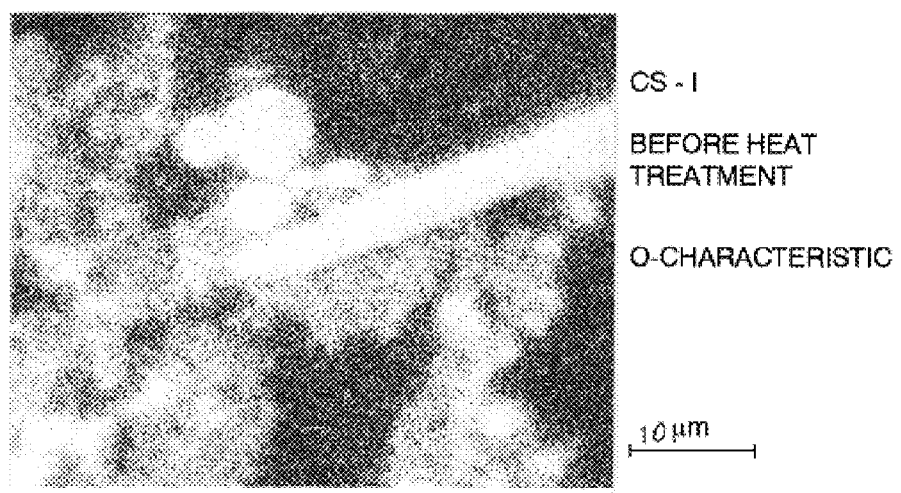
FIG. 15 is an X-ray photograph showing O-characteristic of the composite product produced from the preform CS-I before heat treatment.
Figure 16:
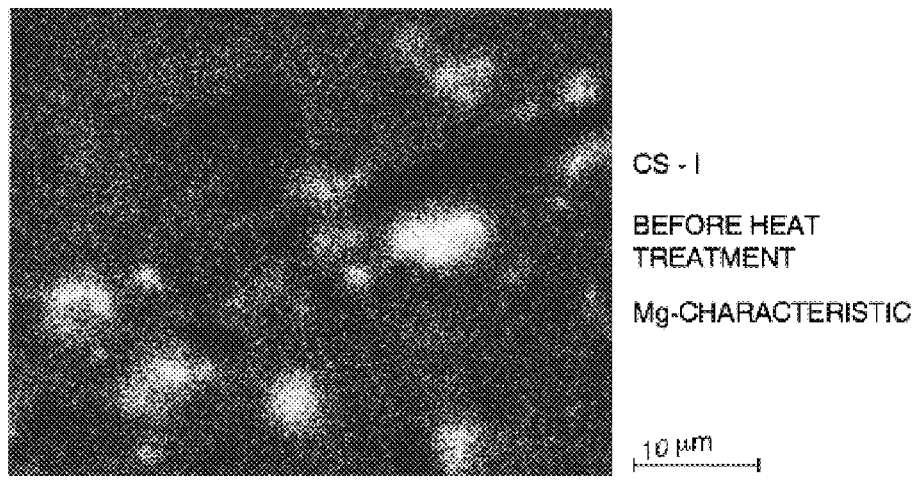
FIG. 16 is an X-ray photograph showing Mg-characteristic of the composite product produced from the preform CS-I before heat treatment.
Figure 17:
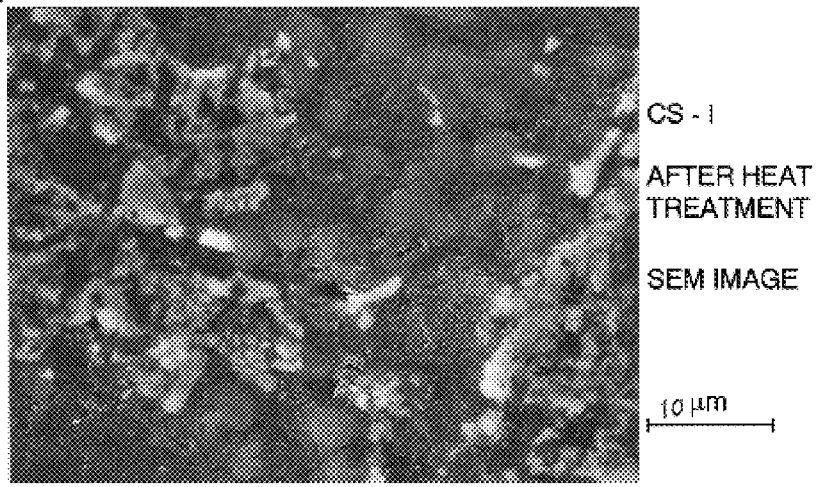
FIG. 17 is an electronic photomicrograph showing a microstructure of the composite product produced from the preform CS-I after T6-heat treatment.
Figure 18:
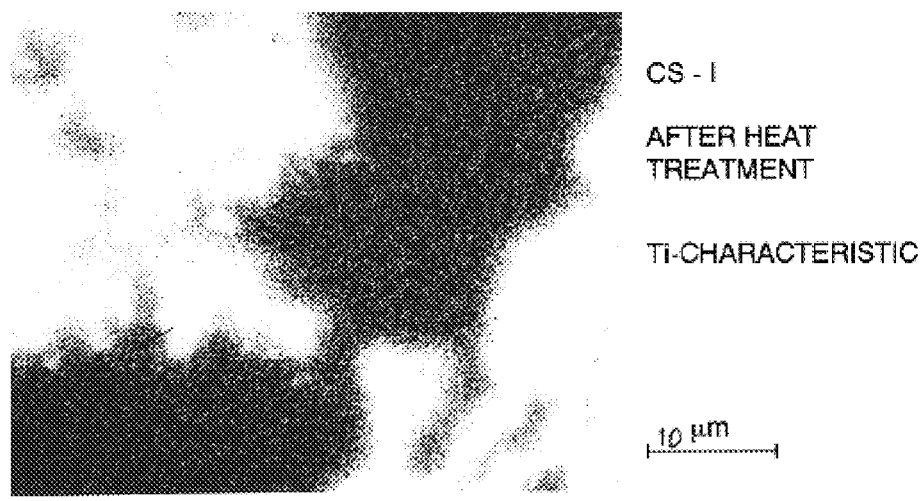
FIG. 18 is an X-ray photograph showing Ti-characteristic of the composite product produced from the preform CS-I after T6-heat treatment.
Figure 19:
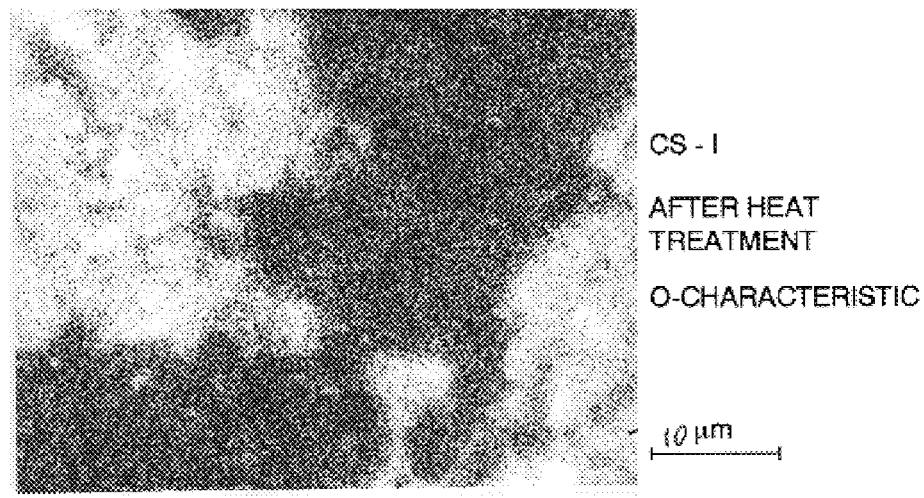
FIG. 19 is an X-ray photograph showing O-characteristic of the composite product produced from the preform CS-I after T6-heat treatment.
Figure 20:
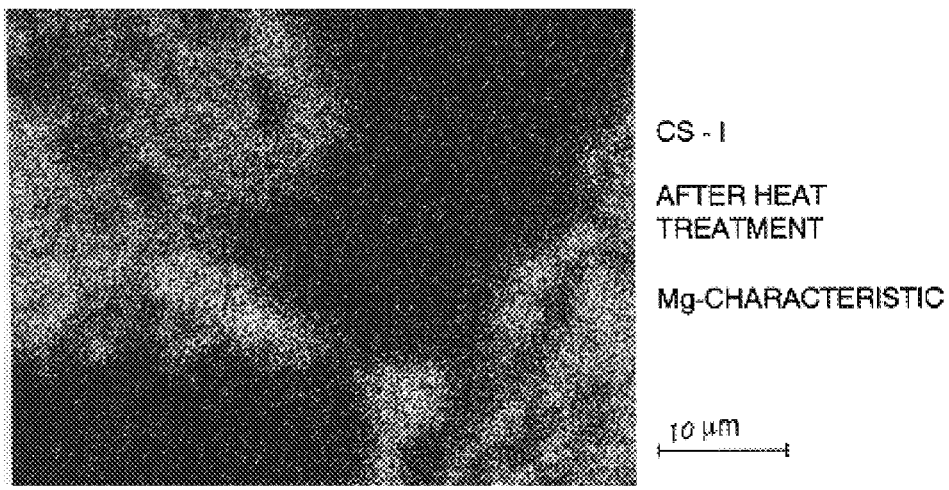
FIG. 20 is an X-ray photograph showing Mg-characteristic of the composite product produced from a preform CS-I after T6-heat treatment.

It is demonstrated in FIGS. 4 through 6 that in the composite product of Example I, calcium (Ca) largely concentrates in portions where titanium oxides ($TiO_2$) particles exist. As seen in FIG. 7, magnesium (Mg) does not exist in the portion where titanium oxides ($TiO_2$) particles exist and approximately uniformly concentrates in portions where titanium oxides ($TiO_2$) does not exist. The same tendency appears in the composite product of Example I after heat treatment. It is demonstrated in FIGS. 14 through 16 that in the comparative composite product, magnesium (Mg) concentrates relatively densely in portions where titanium oxides ($TiO_2$) particles exist. This reveals that the composite product produced from a preform not mixed with calcium carbonate ($CaCO_3$) particles has a tendency for magnesium (Mg) to combine with titanium oxides ($TiO_2$). The composite product enhances this tendency after heat treatment as understood from FIGS. 17 through 20.

EXAMPLE II

A homogeneous slurry was prepared by uniformly dispersing aluminum borate ($9Al_2O_3.2B_2O_3$) whiskers having a mean length between 10 and 30 µm and a mean diameter between 0.5 and 1.0 µm, calcium carbonate ($CaCO_3$) particles having a mean particle size of 5 µm, and an alumina sol as an inorganic binder into water. The homogeneous slurry was poured in a specific shape of container and dewatered as a dewatered slurry product by a vacuum extractor. The reinforcement materials (aluminum borate whiskers and calcium carbonate particles) volume fraction (Vf) of a composite product was adjusted as summarized in Table III. The dewatered slurry product was heated at 1100° C. for two hours to form a rectangular parallelpiped preform EX-II with a base 36 mm×15 mm and a height of 58 mm. After placing the rectangular parallelpiped preform in the die 11 as shown in FIG. 1, a molten aluminum alloy AC8A was poured into the cavity in the die 11 and treated under the condition summarized in Table III to produce a composite product. Further, a comparative sample preform (CS-II) was prepared. A dewatered slurry product was produced from a homogeneous slurry which was the same as that for the preform of Example II, excepting that it was not mixed with calcium carbonate ($CaCO_3$) particles. The dewatered slurry product as a comparative sample preform CS-II having the same dimensions as the example preform EX-II and treated under the condition as summarized in Table III to produce a composite product. The example composite product and the comparative composite product produced from the preforms EX-II and CS-II, respectively, were treated by the T6 heat treatment (solution treatment at 505° C. for 4.5 hours) and water quenching. Further, both composite products were treated by a cooled air precipitation hardening treatment after it was left in an atmosphere at 180° C. for 6 hours.

Figure 21A:
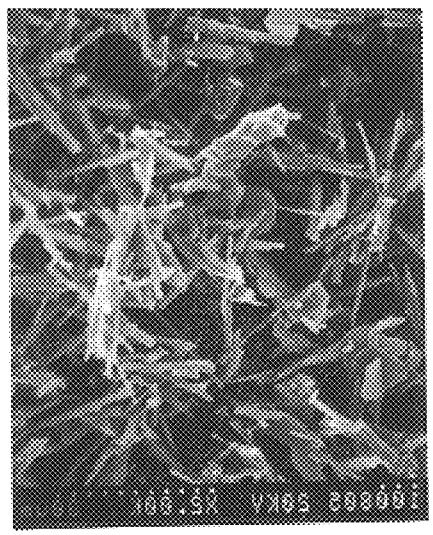
FIG. 21A is an electronic photomicrograph showing a microstructure of a preform EX-II.
Figure 21B:
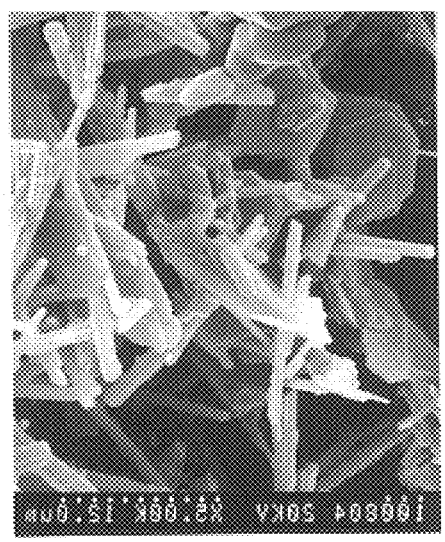
FIG. 21B is an enlarged electronic photomicrograph showing a microstructure of the preform EX-II.
Figure 22A:
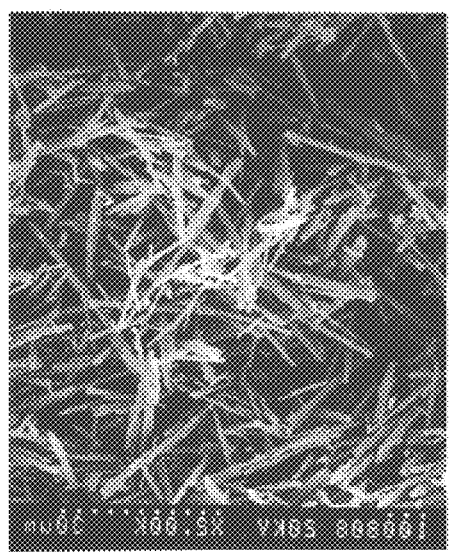
FIG. 22A is an electronic photomicrograph showing a microstructure of a preform CS-II.
Figure 22B:
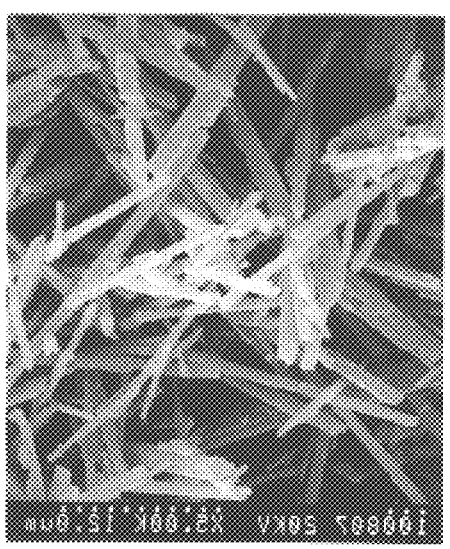
FIG. 22B is an enlarged electronic photomicrograph showing a microstructure of the preform CS-II.

FIGS. 21A and 21B are electronic photomicrographs showing a microstructure of the preform of Example II. As the result of X-ray diffraction analysts, it was proved that formation of compounds such as ($CaAl_2B_2O_7$), ($CaAl_{12}O_{19}$) and ($CaB_2O_5$) appeared around aluminum borate ($9Al_2O_3 \cdot 9B_2O_3$) whiskers. FIGS. 22(a) and 22(b) are electronic photomicrographs showing a microstructure of the comparative sample preform CS-II.

Figure 23A:
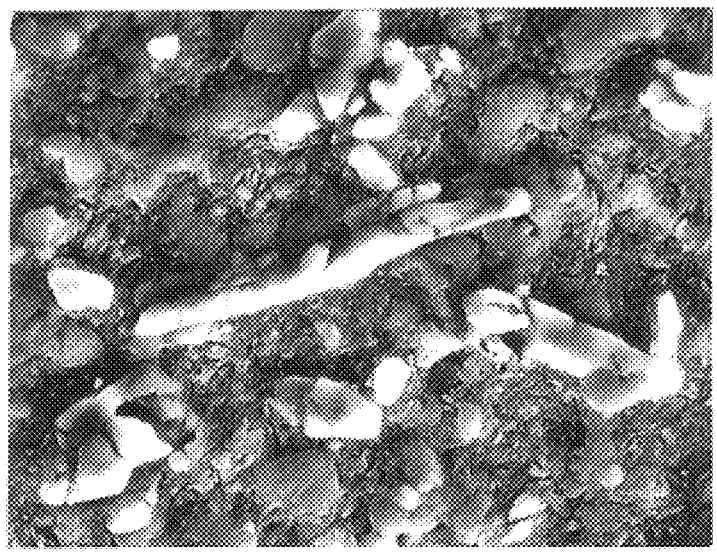
FIG. 23A is an electronic photomicrograph showing a microstructure of a composite product produced from the preform EX-II after heat treatment.
Figure 23B:
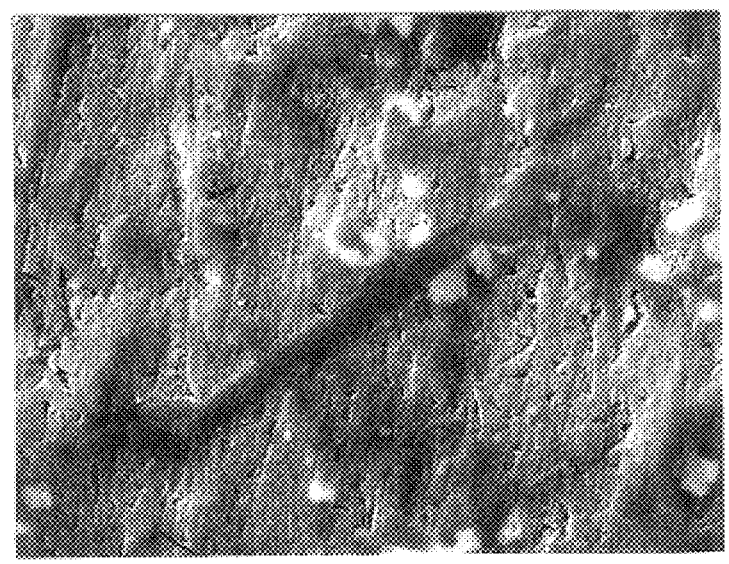
FIG. 23B is an electronic photomicrograph showing a microstructure of a composite product produced from the preform CS-II after heat treatment.
Figure 24A:
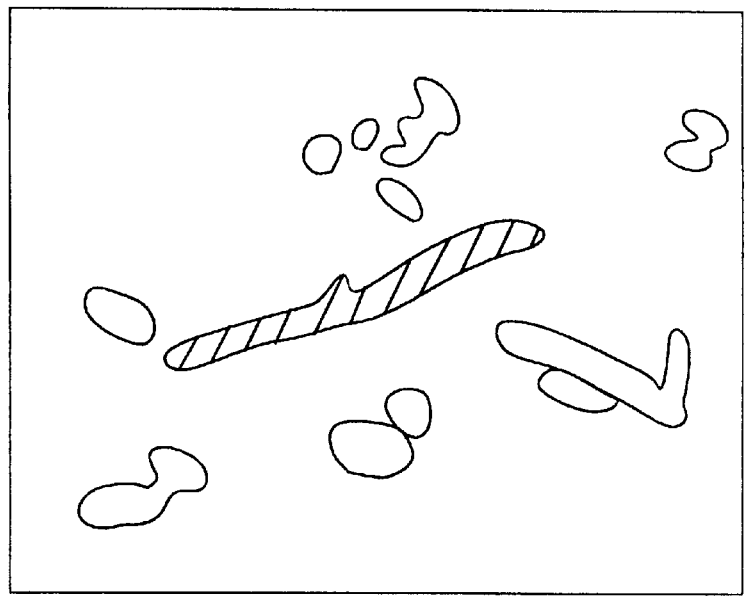
FIG. 24A is a sketch of the electronic photomicrograph shown in FIG. 23A.
Figure 24B:
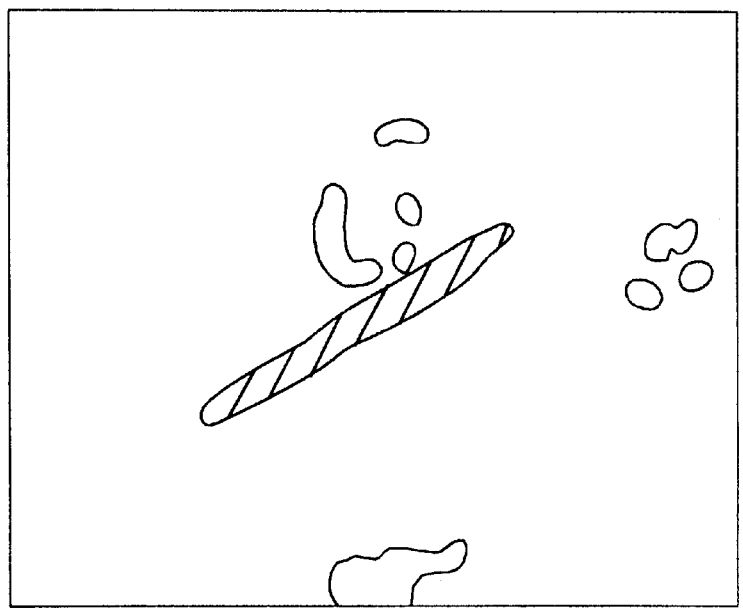
FIG. 24B is a sketch of the electronic photomicrograph shown in FIG. 23B.

FIGS. 23A and 23B are electronic photomicrographs showing microstructure of the composite product produced from the preform of Example II before and after heat treatment, respectively. FIGS. 24A and 24B are sketches of the microstructure shown in FIGS. 23A and 23B, respectively.

TABLE III

|  | EX-I | CS-I |
| --- | --- | --- |
| PREFORM COMPOSITION (Vf %) |  |  |
| Aluminum Borate Whiskers | 15 | 15 |
| Calcium Carbonate | 1.8 | — |
| Sintering Temperature (° C.) | 1100 | 1100 |
| COMPOSING CONDITION |  |  |
| Base Metal | AC8A | AC8A |
| Molten Metal Temperature (° C.) | 780 | 780 |
| Die Temperature (° C.) | 260 | 260 |
| Pressure (MPa) | 150 | 150 |
| Preheating Temperature Of Preform (° C.) | 500 | 500 |

It is demonstrated in FIGS. 21(a), 21(b), 22(a) and 22(b) in which highlight portions indicate whiskers that both composite products have an intertwined microstructure of whiskers. However, when comparing microstructure shown in FIGS. 23A and 23B with microstructure shown in FIGS. 24A and 24B, respectively, it is revealed that while whiskers are left as they are in the composite product produced from the preform EX-II (a shaded portion in the sketch shown in FIG. 24A corresponds to highlight portion in the photomicrograph shown in FIG. 23A), whiskers have disappeared from the comparative composite product produced from the preform CS-II (a shaded portion in the sketch shown in FIG. 24B corresponds to dark portion in the photomicrograph shown in FIG. 23B).

In order to evaluate shrinkage and compressive strength of the preform of the invention, various sample preforms were prepared in a similar process by which the preform EX-II was prepared and, however, had volume contents of whiskers, chopped fibers and calcium carbonate ($CaCO_3$) as summarized in Table IV. In this instance, only a sample preform a-1 containing a reinforcement with a volume fraction of 11% contained flammable particles (powdered graphite particles). The calcium carbonate contents were 12% in volume with relative to whiskers and are summarized by the volume fraction (Vf) in Table IV in which a sample preform containing calcium carbonate ($CaCO_3$) is marked with a circle (○) or a triangle (Δ) and a sample preform not containing calcium carbonate ($CaCO_3$) is marked with a black dot (●).

TABLE IV

| | Volume Fracture: Vf (%) | | | |
| --- | --- | --- | --- | --- |
| Mark In FIG. 25 | Sample Preform | Whiskers | Chopped Fibers | Calcium Carbonate |
| ○ | a - 1 | 11 | — | 1.2 |
|  | a - 2 | 15 | — | 1.8 |
|  | a - 3 | 20 | — | 2.4 |
| Δ | b - 1 | 15 | 3 | 1.8 |
|  | b - 2 | 20 | 3 | 2.4 |
| ● | c - 1 | 15 | — | — |
|  | c - 2 | 23 | — | — |

Figure 25:
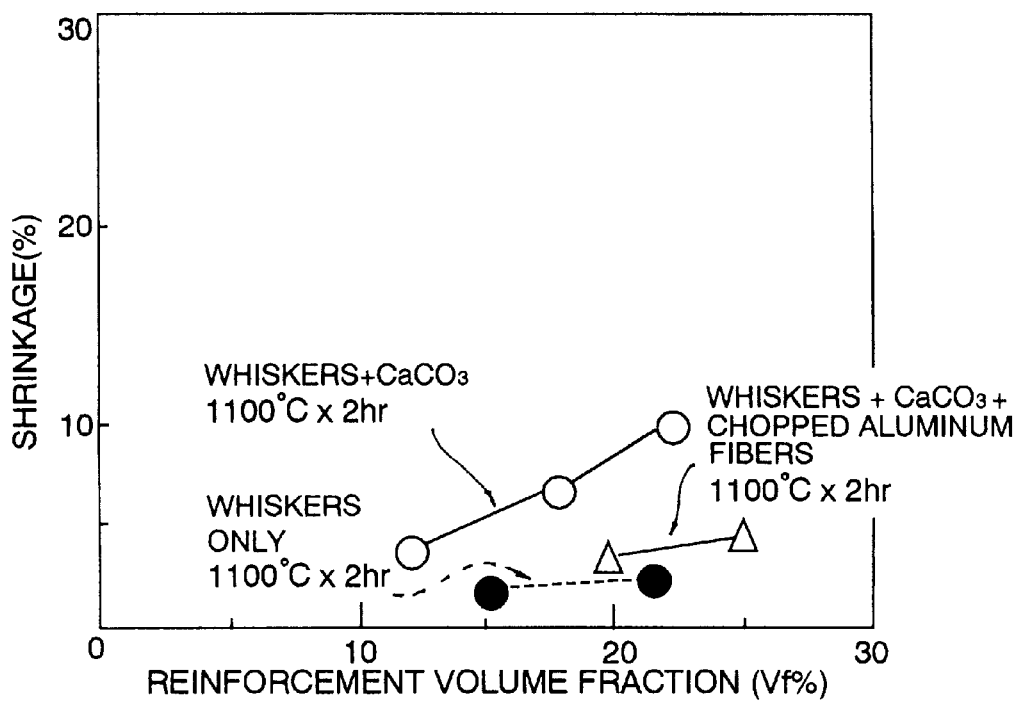
FIG. 25 is a graph showing the relationship between shrinkage and volume fraction of a preform.

Preform shrinkage in percentage as measured by a change in length of each sample preform before and after sintering is shown with respect to various reinforcement volume fractions (Vf) in FIG. 25. As apparent in FIG. 25, the sample preforms containing calcium carbonate ($CaCO_3$) have higher shrinkage than the sample preforms not containing calcium carbonate ($CaCO_3$) and chopped fibers causes a drop in shrinkage percentage of each preform irrespective of the containment of calcium carbonate ($CaCO_3$).

Figure 26:
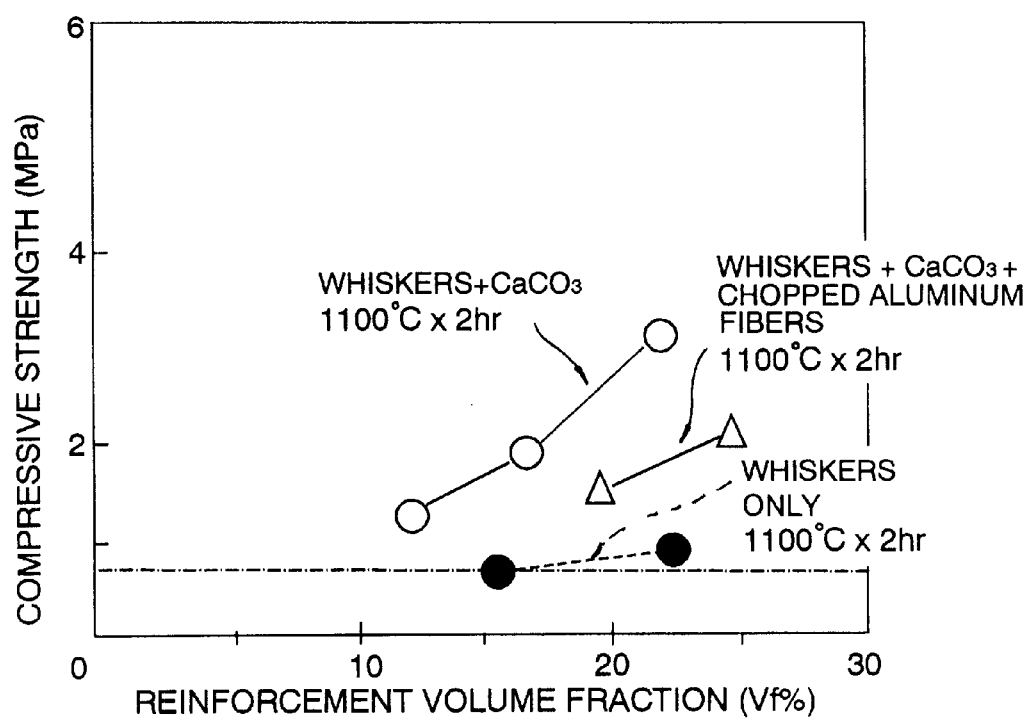
FIG. 26 is a graph showing the relationship between strength and volume fraction of a preform.

Preform compressive strength as measured by a mechanical breaking load in pressure (MPa) of each sample preform with a size 15 mm×15 mm×15 mm is shown with respect to various volume fractions (Vf) of reinforcement materials (whiskers and chopped fibers) in FIG. 26. As apparent in FIG. 26, the sample preforms containing calcium carbonate ($CaCO_3$) have higher compressive strength than the sample preforms not containing calcium carbonate ($CaCO_3$). It is also apparent that while the sample preforms containing calcium carbonate ($CaCO_3$) increase their compressive strength with an increase in reinforcement volume fraction, the sample preforms not containing calcium carbonate ($CaCO_3$) do not show an increase in their compressive strength irrespective of an increase in reinforcement volume fraction. The increase in strength of the preform containing calcium carbonate ($CaCO_3$) is considered to result from an increase in strength of aluminum borate ($9Al_2O_3 \cdot 2B_2O_3$) whiskers due to chemical combination of the aluminum borate ($9Al_2O_3 \cdot 2B_2O_3$) with calcium oxide (CaO). Between the preforms contain calcium carbonate ($CaCO_3$) and have the same reinforcement volume fraction, the preform containing chopped aluminum fibers as one of reinforcement materials shows a lower strength than the preform not containing chopped aluminum fibers. This is considered that the aluminum fiber contained preform is less affected by the strengthening effect due to chemical combination of the aluminum borate ($9Al_2O_3 \cdot 9B_2O_3$) with calcium oxide (CaO). In FIG. 26, a dotted chain line shows a lower limit of compressive strength necessary for a preform to produce a composite product.

Figure 27:
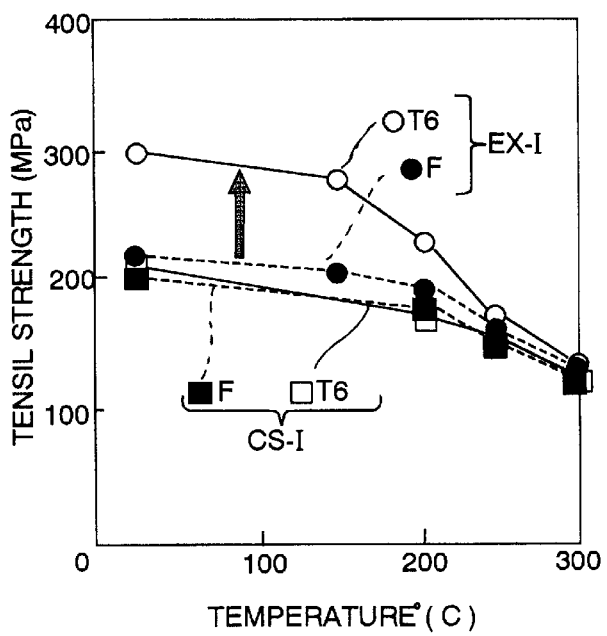
FIG. 27 is a graph showing the relationship between tensile strength and heat treatment temperature of a composite product.

Tensile strength of the composite products produced from the preforms EX-I and CS-I, respectively, as measured before and after T6-heat treatment by a mechanical breaking force in pressure (MPa) at specified test temperatures of 25° C., 150° C., 200° C., 250° C. and 300° C. under the requirements for tensile test of metals in Japanese Industrial Standard is shown in FIG. 27. As was mentioned, the preforms EX-I and CS-I are composed mainly of ceramic particles. In FIG. 27, tensile strength is marked with a circle (○) for the T6-composite product produced from the preform EX-I, with a black dot (●) for the F-composite product produced from the preform EX-I, with a square (□) for the T6-composite product produced from the preform CS-I, and with a black square (■) for the F-composite product produced from the preform CS-I. As apparent in FIG. 27, in view of improvement of strength, the heat treatment is ineffective to the composite product produced from the preform CS-I but effective to the composite product produced from the preform EX-I. This indicates that the composite product produced from a preform mixed with calcium carbonate ($CaCO_3$) provides an increase in strength by means of T6-heat treatment.

Tensile strength of the composite products produced from the preforms a-1 and c-1 composed mainly of ceramic whiskers, respectively, as measured before and after T6-heat treatment by a mechanical breaking force in pressure (MPa) under the requirements for tensile test of metals in Japanese Industrial Standard and their hardness are summarized in Table V.

TABLE V

| Composite Product | | | Tensile Strength (MPa) | | Hardness (Hv) | |
| --- | --- | --- | --- | --- | --- | --- |
| Preform | Whiskers | Calcium Carbonate | F-Product | T6-Product | F-Product | T6-Product |
| a-1 | Vf = 11% | Vf = 1.2% | 110–120 | 160–170 | 90 | 140–155 |
| c-1 | Vf = 15% | — | 110–120 | 120–140 | 90 | 85–90 |

As apparent in Table V, in view of improvement of strength and hardness, the heat treatment is ineffective to the composite product produced from the preform c-1 not mixed with calcium carbonate ($CaCO_3$) but effective to the composite product produced from the preform a-1 mixed with calcium carbonate ($CaCO_3$). In the light of the result, it is advantageous to mix a preform with calcium carbonate ($CaCO_3$) in order for a composite product produced from the preform to exhibit an heat treatment effect.

Abrasion resistance tests for rings and disks as composite products produced from the preforms EX-I and CS-I and other composite products were produced under the test condition summarized in Table VI. The other composite products included simple aluminum alloy products such as AC8A and A390, a niresist cast iron, a nickel-chromium (Ni—Cr) cermet composite product produced by the same process as the composite product of the invention from a porous metal preform with reinforcements of an 8% volume fraction which was formed by sintering a foamed plastic material with powdered nickel particles adhered thereon, and an aluminum alloy (AC8A) composite product mixed with chopped aluminum fibers as a reinforcement after the T6-heat treatment. The result is summarized in FIG. 28.

TABLE VI

| | |
| --- | --- |
| Ring Material | SCR420(HRc45) |
| Surface Pressure | 10 MPa |
| Test Temperature | 100° C. |
| Slide Velocity | 0.5 m/s |
| Slide Distance | 5000 m |
| Lubricant | Motor Oil 10W-30 |

Figure 28:
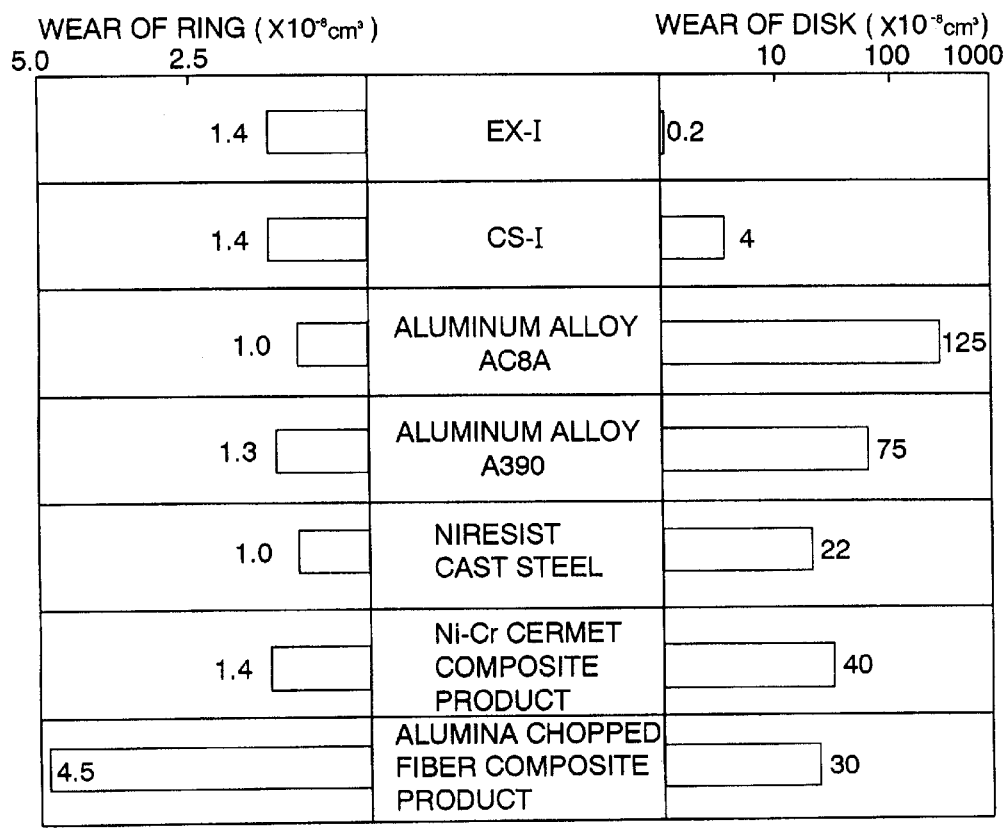
FIG. 28 is a graph showing a result of abrasion resistance tests of various composite products.

As apparent from FIG. 28, the composite product produced from the preform of the invention is superior in abrasion resistance to the metal cermet composite product and the composite product containing a non-preformed reinforcement. Furthermore, the composite product produced from the preform EX-I of the invention which contains calcium carbonate ($CaCO_3$) is superior in abrasion resistance to the composite product produced from the preform CS-I which does not contain calcium carbonate ($CaCO_3$). This is considered that the preform containing calcium carbonate calcium carbonate ($CaCO_3$) causes titanium oxides ($TiO_2$) to exhibit its own abrasion resistance.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A preform for producing a composite product, said preform comprising:

at least one of oxide type ceramic particles and oxide type ceramic whiskers chemically reactive with magnesium (Mg) which are sintered to form a predetermined skeletal structure of a composite product; and a metal oxide having standard energy of formation equal to or less than a magnesium oxide (MgO) and existing as a chemical compound formed resulting from a chemical reaction with said at least one of oxide type ceramic particles and oxide type ceramic whiskers.

2. The preform as defined in claim 1, wherein said oxide type ceramic particle is one of a titanium oxide ($TiO_2$) particle and a silicon oxide ($SiO_2$) particle.

3. The preform as defined in claim 1, wherein said oxide type ceramic particle has a mean particle size between 0.1 and 10.0 μm.

4. The preform as defined in claim 1, wherein said oxide type ceramic whisker is one of an aluminum borate ($9Al_2O_3 \cdot 2B_2O_3$) whisker and a potassium titanium ($K_2O \cdot 6TiO_2$) whisker.

5. The preform as defined in claim 1, wherein said oxide type ceramic whisker has a mean diameter between 0.5 and 1.0 μm and a mean length between 10 and 30 μm.

6. The preform as defined in claim 1, wherein when only said oxide type ceramic particles are used, a volume fraction of said oxide type ceramic particles with respect to said composite product is less than 25%.

7. The preform as defined in claim 1, wherein when only said oxide type ceramic whiskers are used, a volume fraction of said oxide type ceramic whiskers with respect to said composite product is less than 15%.

8. The preform as defined in claim 1, wherein when both said oxide type ceramic particles and said oxide type ceramic whiskers are used, volume fractions of said oxide type ceramic particles with respect to said composite product and said oxide type ceramic whiskers are less than 25% and 15%, respectively.

9. The preform as defined in claim 1, and further comprising chopped fibers.

10. The preform as defined in claim 1, wherein said metal oxide is at least one of a calcium oxide (CaO) and a magnesium oxide (MgO).

11. The preform as defined in claim 1, wherein said metal oxide is in the form of particle having a mean size between 0.1 and 10 $\mu$m.

12. The preform as defined in claim 1, wherein a volume content of said metal oxide with respect to said preform is between 0.1 and 80%.

13. The preform as defined in claim 1, wherein a volume content of said metal oxide with said titanium oxide ($TiO_2$) particles is 1%.

14. The preform as defined in claim 1, wherein a volume content of said metal oxide with respect to said oxide type ceramic whiskers is between 0.6 and 25%.

15. The preform as defined in claim 1, and further comprising an inorganic binder.

16. The preform as defined in claim 3, wherein said oxide type ceramic particle has a mean particle size between 0.3 and 1.0 $\mu$m.

17. The preform as defined in claim 9, wherein said chopped fiber has a mean diameter between 2 and 10 $\mu$m and a mean length between 200 and 300 $\mu$m.

18. A preform for producing a composite product, said preform comprising:
   at least one of titanium oxide ($TiO_2$) particles, silicon oxide ($SiO_2$) particles, aluminum borate ($9Al_2O_3 \cdot 2B_2O_3$) whiskers and potassium titanium ($K_2O \cdot 6TiO_2$) whiskers which are sintered to form a predetermined skeletal structure of the composite product;
   at least one of a calcium oxide (CaO), a magnesium oxide (MgO) and an aluminum oxide ($Al_2O_3$) having standard energy of formation equal to or less than a magnesium oxide (MgO) and existing as a chemical compound formed resulting from a chemical reaction with said at least one of titanium oxide ($TiO_2$) particles, silicon oxide ($SiO_2$) particles, aluminum borate ($9Al_2O_3 \cdot 2B_2O_3$) whiskers and potassium titanium ($K_2O \cdot 6TiO_2$) whiskers; and
   chopped fibers.

19. A composite product comprising:
   a porous preform comprising at least one of oxide type ceramic particles and oxide type ceramic whiskers chemically reactive with magnesium (Mg) which are sintered to form a predetermined skeletal structure of the composite product and a metal oxide having standard energy of formation equal to or less than a magnesium oxide (MgO) and existing as a chemical compound formed resulting from a chemical reaction with said at least one of oxide type ceramic particles and oxide type ceramic whiskers; and
   a light metal alloy containing magnesium (Mg) filled in pores of said porous preform.

20. The composite product as defined in claim 19, wherein said composite product includes a structure of magnesium silicate ($Mg_2Si$).

21. The composite product as defined in claim 19, wherein a volume fraction of said porous preform with respect to said composite product is between 10 and 25%.

22. The composite product as defined in claim 19, wherein said oxide type ceramic particle is one of a titanium oxide ($TiO_2$) particle and a silicon oxide ($SiO_2$) particle.

23. The composite product as defined in claim 19, wherein said oxide type ceramic whisker is one of an aluminum borate ($9Al_2O_3 \cdot 2B_2O_3$) whisker and potassium titanium ($K_2O \cdot 6TiO_2$) whisker.

24. The composite product as defined in claim 19, wherein said porous preform further comprises chopped fibers.

25. The composite product as defined in claim 19, wherein said metal oxide is at least one of a calcium oxide (CaO) and a magnesium oxide (MgO).

26. A process of forming a preform for a composite product, said preform forming process comprising the steps of:
   preparing a homogeneous mixture of at least one of oxide type ceramic particles and oxide type ceramic whiskers chemically reactive with magnesium (Mg) and at least one of a metal oxide having standard energy of formation equal to or less than a magnesium oxide (MgO) and an inorganic chemical compound formed resulting from a chemical reaction with said metal oxide; and
   heating said homogeneous mixture to sinter said at least one of oxide type ceramic particles and oxide type ceramic whiskers with an effect of causing said metal oxide to chemically react with said at least one of oxide type ceramic particles and oxide type ceramic whiskers.

27. The preform forming process as defined in claim 26, wherein said oxide type ceramic particle is one of a titanium oxide ($TiO_2$) particle and a silicon oxide ($SiO_2$) particle.

28. The preform forming process as defined in claim 26, wherein said oxide type ceramic whisker is one of an aluminum borate ($9Al_2O_3 \cdot 2B_2O_3$) whisker and a potassium titanium ($K_2O \cdot 6TiO_2$) whisker.

29. The preform forming process as defined in claim 26, wherein said inorganic compound is calcium carbonate ($CaCO_3$).

30. The preform forming process as defined in claim 26, wherein said metal oxide has a volume content of said metal oxide with respect to said preform is between 0.1 and 80%.

31. The preforming forming process as defined in claim 26, wherein said metal oxide is at least one of a calcium oxide (CaO) and a magnesium oxide (MgO).

32. The preform forming process as defined in claim 26, wherein said homogeneous mixture further contains flammable particles.

33. The preform forming process as defined in claim 26, wherein said homogeneous mixture further contains an inorganic binder.

34. The preform forming process as defined in claim 26, wherein said homogeneous mixture further contains chopped fibers.

35. The preform forming process as defined in claim 29, and further comprising the steps of mixing a dispersion medium containing water with said homogeneous mixture to form a mixture slurry and dewatering said slurry in a container having a given shape to provide a dewatered product of said homogeneous mixture.

36. The preform forming process as defined in claim 32, wherein said flammable particle is a powdered graphite particle.

37. The preform forming process as defined in claim 32, wherein said flammable particle has a mean particle size between 1 and 250 $\mu$m.

38. The preform forming process as defined in claim 37, wherein said flammable particle has a mean particle size between 30 and 100 $\mu$m.

39. A process of forming a preform for a composite product, said preform forming process comprising the steps of:
   preparing a homogeneous mixture of at least one of oxide type ceramics, chemically reactive with magnesium (Mg), which include titanium oxide ($TiO_2$) particles, silicon oxide ($SiO_2$) particles, aluminum borate ($9Al_2O_3 \cdot 2B_2O_3$) whiskers and potassium titanium ($K_2O \cdot 6TiO_2$) whiskers, at least one of metal oxides having standard energy of formation equal to or less than a magnesium oxide (MgO) which include a calcium oxide (CaO), a magnesium oxide (MgO) and an aluminum oxide ($Al_2O_3$), calcium carbonate ($CaCO_3$) as an inorganic chemical compound formed resulting from a chemical reaction with said metal oxide flammable particles and chopped fibers; and heating said homogeneous mixture to sinter said oxide type ceramic particles with an effect of causing said metal oxide to chemically react with said oxide type ceramic particles.

* * * * *